US008418372B1

(12) United States Patent
Risley, Sr. et al.

(10) Patent No.: US 8,418,372 B1
(45) Date of Patent: Apr. 16, 2013

(54) IRRIGATION FITTING TOOL DEVICE

(76) Inventors: William B. Risley, Sr., Scottsdale, AZ (US); Margaret J. Risley, Scottsdale, AZ (US)

( * ) Notice: Subject to any disclaimer, the term of this patent is extended or adjusted under 35 U.S.C. 154(b) by 1186 days.

(21) Appl. No.: 12/251,353

(22) Filed: Oct. 14, 2008

Related U.S. Application Data

(60) Provisional application No. 60/998,588, filed on Oct. 12, 2007.

(51) Int. Cl.
*B26B 17/00* (2006.01)
*B23P 19/04* (2006.01)

(52) U.S. Cl.
USPC .................. 30/280; 30/90.1; 30/124; 30/294; 29/268; 269/6

(58) Field of Classification Search .................. 30/90.1, 30/90.2, 90.4, 90.6, 90.8, 91.1, 91.2, 92, 30/134, 253, 278, 280, 120.3, 120.4; 29/267, 29/268, 270, 255, 261, 262; 269/3, 6
See application file for complete search history.

(56) References Cited

U.S. PATENT DOCUMENTS

| | | | | | |
|---|---|---|---|---|---|
| 198,678 | A | * | 12/1877 | Poole | 30/120.3 |
| 221,622 | A | * | 11/1879 | Sly | 7/131 |
| 343,351 | A | * | 6/1886 | Watrous | 30/120.3 |
| 508,355 | A | * | 11/1893 | Streeter et al. | 30/120.3 |
| 1,105,473 | A | * | 7/1914 | Walker | 269/239 |
| 1,312,149 | A | * | 8/1919 | Zaljs | 30/120.3 |
| 1,483,456 | A | * | 2/1924 | Kroon | 30/120.4 |
| 1,922,884 | A | * | 8/1933 | De Golyer | 30/120.4 |
| 2,566,434 | A | * | 9/1951 | Toth et al. | 451/540 |
| 2,582,736 | A | * | 1/1952 | Altieri | 30/178 |
| 2,998,649 | A | * | 9/1961 | Miller et al. | 606/138 |
| 3,618,431 | A | * | 11/1971 | Nockleby | 81/329 |
| 3,710,406 | A | * | 1/1973 | Stanford | 7/107 |
| 3,879,846 | A | * | 4/1975 | Allen, Jr. | 606/138 |
| 3,906,957 | A | * | 9/1975 | Weston | 606/205 |
| 3,972,333 | A | * | 8/1976 | Leveen | 606/174 |
| 4,017,958 | A | * | 4/1977 | Diggs | 29/268 |
| 4,053,979 | A | * | 10/1977 | Tuthill et al. | 606/138 |
| 4,522,339 | A | * | 6/1985 | Costa | 239/272 |
| 4,607,544 | A | * | 8/1986 | Jewell, Jr. | 81/9.4 |
| 5,016,353 | A | * | 5/1991 | Iten | 30/124 |
| 5,047,037 | A | * | 9/1991 | Brandfield | 606/138 |
| 5,419,045 | A | * | 5/1995 | Magdich | 30/145 |
| 5,435,029 | A | * | 7/1995 | Carlson, Jr. et al. | 7/107 |
| 5,438,759 | A | * | 8/1995 | Dieringer | 30/234 |
| 5,893,201 | A | * | 4/1999 | Myers | 29/268 |
| 5,964,033 | A | * | 10/1999 | Wolf | 30/28 |
| 6,581,262 | B1 | * | 6/2003 | Myers | 29/268 |
| 6,708,749 | B2 | * | 3/2004 | McLeod | 156/763 |
| 6,745,473 | B2 | * | 6/2004 | Lawler | 30/90.1 |
| 7,185,409 | B1 | * | 3/2007 | Myers | 29/268 |
| 7,730,620 | B1 | * | 6/2010 | Anastasi | 30/294 |

* cited by examiner

*Primary Examiner* — Hwei C Payer
(74) *Attorney, Agent, or Firm* — Schmeiser, Olsen & Watts LLP

(57) ABSTRACT

The present invention is an apparatus for use with irrigation systems. The tool may be used for connecting and removing sprinkler fittings for drip systems. The irrigation tubing may be held between the rotatable tool jaws located near the ends of coextensive members of the tool, allowing a user to easily install or uninstall sprinkler fittings from the irrigation tubing. The tool provides a cutter to accurately sheer the irrigation tubing while it is securely held in place in through holes located in the coextensive members.

7 Claims, 6 Drawing Sheets

IRRIGATION FITTING TOOL DEVICE

CROSS-REFERENCE TO RELATED APPLICATION

The present application is related to and claims priority from prior U.S. provisional application Ser. No. 60/998,588, filed Oct. 12, 2007, entitled "DRIP SYSTEM SPRINKLER FITTING TOOL DEVICE", the contents of which are incorporated herein by reference.

BACKGROUND OF THE INVENTION

1. Field of the Invention

The present invention relates generally to the field of clamping tools and more specifically relates to an apparatus used for installing or uninstalling sprinkler fittings for irrigation drip systems.

2. Description of the Related Art

Problems exist when drip systems are installed or maintained because of the flexibility of the irrigation tubing, the rigidity of the aperture for receiving a fitting, and the general slippery consistency of the fittings and tubing. These contributing factors tend to make the process both frustrating and time-consuming. The flexibility and slippery consistency of the tubing prevents the installer from getting a firm grip on the tubing in order that a sprinkler fitting may be inserted into or pulled out of the end of the tubing. Additionally, the rigidity of the aperture for receiving the fitting results in a high friction relationship between the fitting and the tubing resulting in difficulty of insertion and removal of the fitting due to the high finger pressure required to insert or remove the fitting from the tubing. The tubing tends to kink rendering it damaged and susceptible to future cracking thereby potentially introducing leaks to the system. Valuable time and materials may be wasted, increasing overall project costs. Increases in utility costs and water damage to adjacent structures may result if damages to the system are not noticed immediately.

During installation there is also a need to produce straight, uniform cuts in the irrigation tubing material, thereby permitting the tubing to fit flush against the body of the fittings when installed. Angled cuts allow less surface contact area for connection and may reduce effectiveness and efficiency of the drip system due to leaks and possible contamination by external environmental elements.

Thus, a need exists for a safe, portable, irrigation fitting tool to operate reliably allowing a user to efficiently install or uninstall sprinkler fittings within an irrigation drip system and to avoid the above-mentioned problems.

BRIEF SUMMARY OF THE INVENTION

The present invention holds significant improvements and serves as an irrigation fitting tool device and system comprising: an u-shaped tool body forming a radius resiliently and integrally securing together a rigid, substantially flat first coextensive member and a rigid, substantially flat second coextensive member; a first through bore opening through the rigid, substantially flat first coextensive member a second through bore opening through the rigid, substantially flat second coextensive member; a first tool jaw coupled to the rigid, substantially flat first coextensive member via a pivotal pin; a second tool jaw coupled to the rigid, substantially flat second coextensive member via a removable pivotal pin; a clamp further comprising a guider and a first through bore wherein a length of irrigation tube may be supported at an angle perpendicular to the clamp; and a cutter. The cutter comprises: a cutter body having a first and second end wherein the cutter body comprises a rigid material; at least two facets forming a sharp point at the first end of the cutter body; an angularly disposed member at the second end of the cutter body, wherein the angularly disposed member is substantially perpendicular to the cutter body and may act as a stopper and a pusher/puller.

A method of use for the irrigation fitting tool device and system is disclosed comprising the steps of: pushing an irrigation tubing through a first through hole in a first coextensive member; continuing to push the irrigation tubing through a second through hole in a second coextensive member; manually cutting the irrigation tubing using a cutter guided within a clamp located on the first coextensive member; removing the usable cut portion of the irrigation tubing from the first through hole in the first coextensive member; then releasably clamping the usable cut portion of the irrigation tubing between a first tool jaw located on the first coextensive member and a second tool jaw located on the second coextensive member; and finally pushing a fitting into the clamped irrigation tubing.

BRIEF DESCRIPTION OF THE DRAWINGS

The objects and advantages of the instant invention will become readily apparent to those skilled in the art from the following detailed description thereof, taken in conjunction with the drawings, in which.

DETAILED DESCRIPTION OF THE PREFERRED EMBODIMENT

Figure 1:
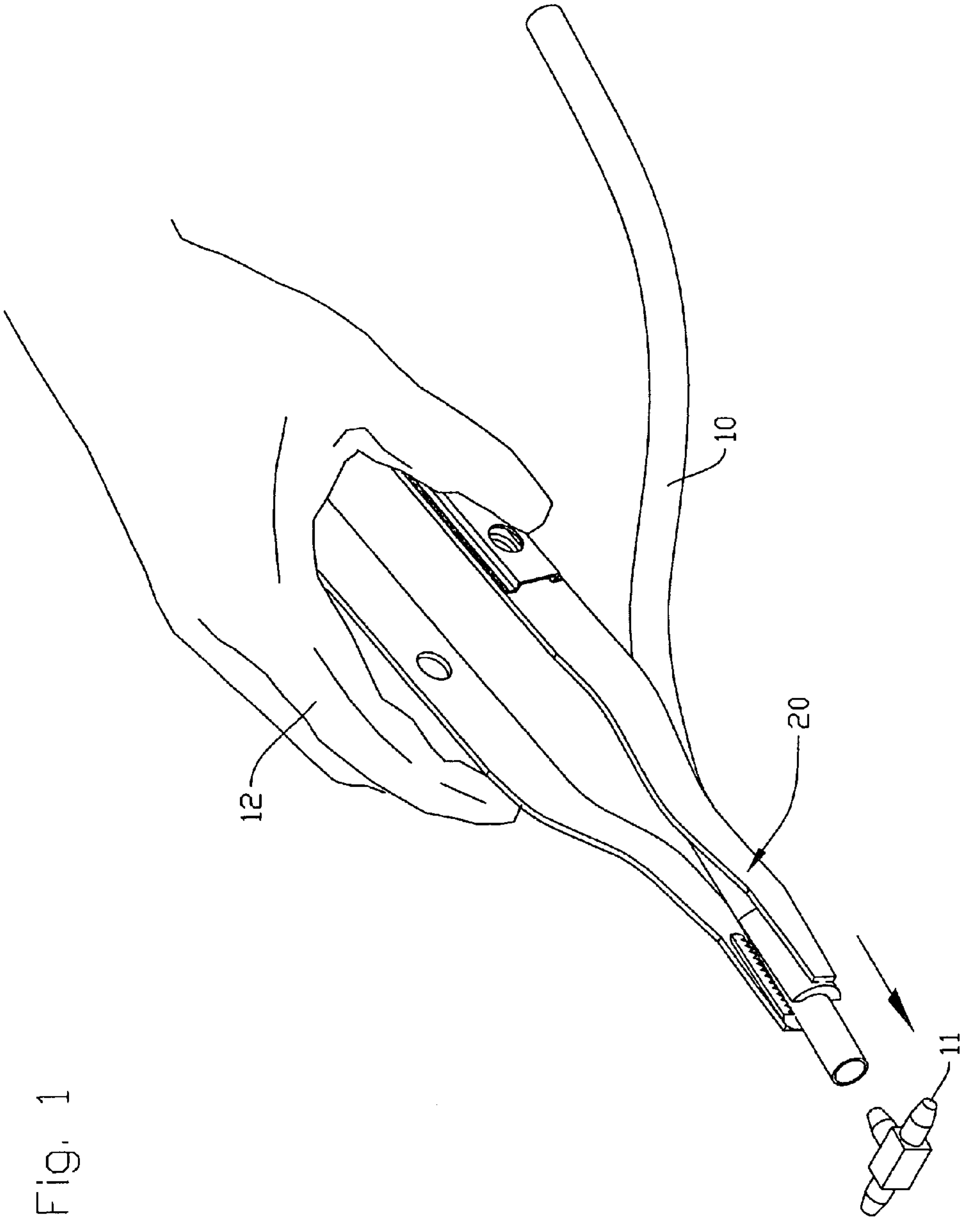
FIG. 1 is a perspective view of a tool device showing usage.

Turning now to the drawings, in which like reference characters indicate corresponding elements throughout the several views, attention is first directed to FIG. 1 in which is seen tubing 10, which may be commercial irrigation tubing preferably made of rubber, plastic or other suitable material, fitting 11, which may be a commercially available irrigation tube fitting, and a person's hand 12. Also seen is a tool device embodying the principles of the present invention and generally designated by the reference character 20. Person's hand 12 is shown as it may appear when gripping tool device 20.

Figure 2:
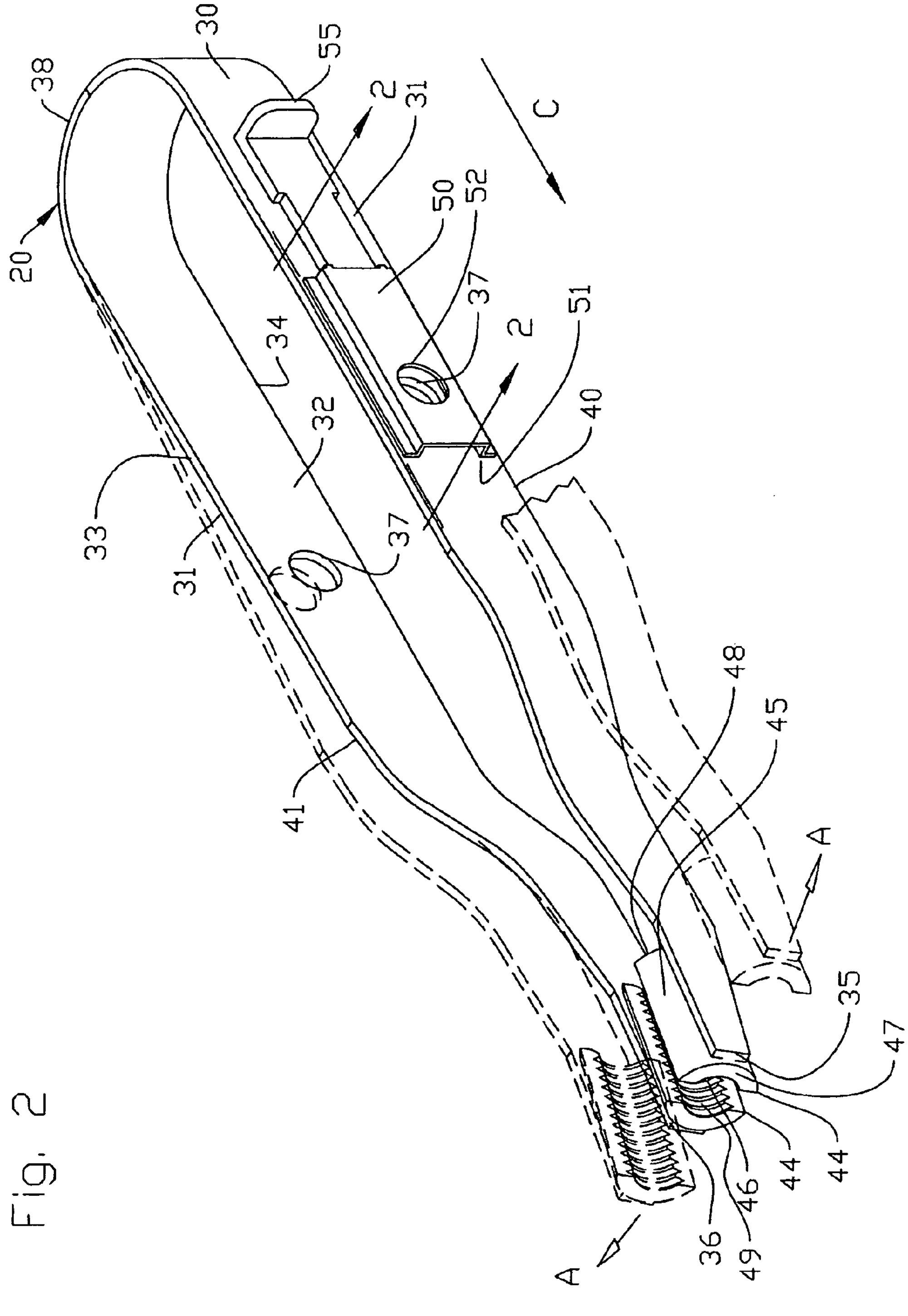
FIG. 2 is a perspective view of a tool device of this invention showing movement.

In FIG. 2 is seen tool device 20 including body 30 having outer surface 31, inner surface 32, upper edge 33, lower edge 34, end 35, end 36, a plurality of opening 37. Distal end 35 and end 36, body cooperates to form curved area 38 and coextensive members 40 and 41 providing relative movement between a gripping position and a release position, as shown in phantom. The direction of movement is indicated by directional arrows A. Also included is a plurality of jaws 44 having outer surface 45, inner surface 46 (which preferably comprises a semi-circular arcuate shape to fit over tubing 10), frontward end 47, and rearward end 48. Inner surface 46 may include a plurality of edged undulations 49 or other such non-smooth surface. Outer surface 45 of jaws 44 are affixed to inner surface 32 of body 30 and preferably retained with welding or adhesive methods. It should be appreciated that other methods of securing jaws 44 could include retaining bands, through bolts or the like. Furthermore, toward the ends 35 and 36, the inner surface 32 could be fashioned with teeth, undulations or other gripping surfaces. Body 30 and jaws 44 are preferably made from a rigid or semi-rigid material, such as metal, plastic, or composite. Also shown is clamp 50 having rearward surface 51 and opening 52. Clamp 50 is preferably made from a metal such as steel, stainless steel, or iron. Surface 51 of clamp 50 is affixed to surface 31 of body 30 preferably using welding, or alternately preferably by molding, press-fitting, attachment through heating means, use of various fasteners or by adhesive methods. Seen also, is cutter 55 which is slidably carried against surface 31 of body 30 and which is detailed in FIG. 6.

Figure 3:
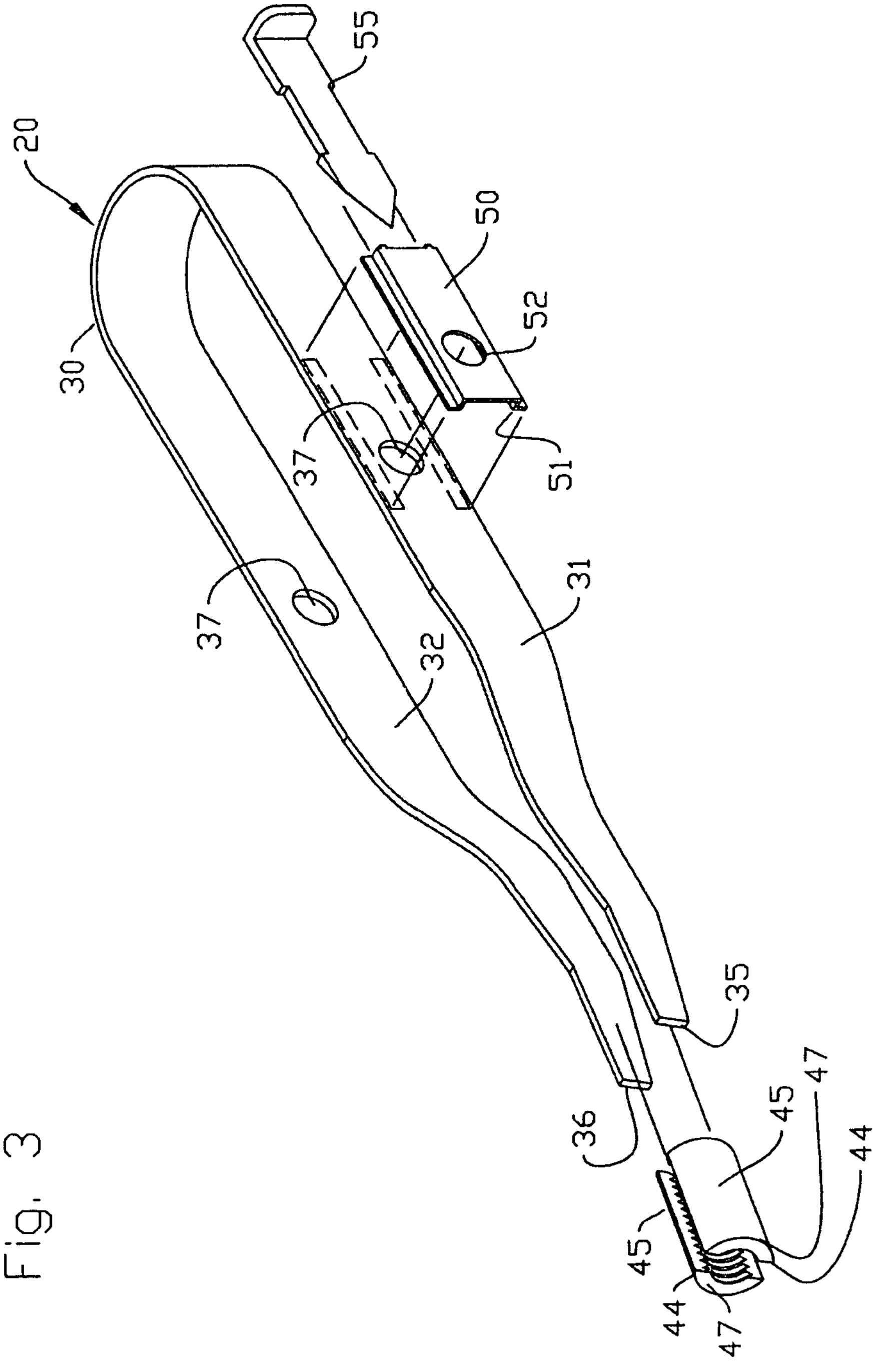
FIG. 3 is an exploded perspective view of this invention.

In FIG. 3 is again seen tool device 20, including body 30 having outer surface 31, inner surface 32, end 35, end 36, and openings 37, jaws 44 having outer surface 45 and end 47, clamp 50 having rearward surface 51 and opening 52. Also seen is cutter 55. Surface 51 of clamp 50 is affixed against surface 31 of body 30 with opening 52 being generally coincident with opening 37 in body 30, and preferably retained using welding, molding, or adhesive methods. Shown also is a plurality of jaws 44 having outer surface 45 and end 47. Jaws 44 are affixed against surface 32 of body 30 with end 47 being proximate end 35 and 36 respectively, and preferably retained using welding, or alternately preferably by molding, press-fitting, attachment through heating means, use of various fasteners or by adhesive methods.

Figure 4:
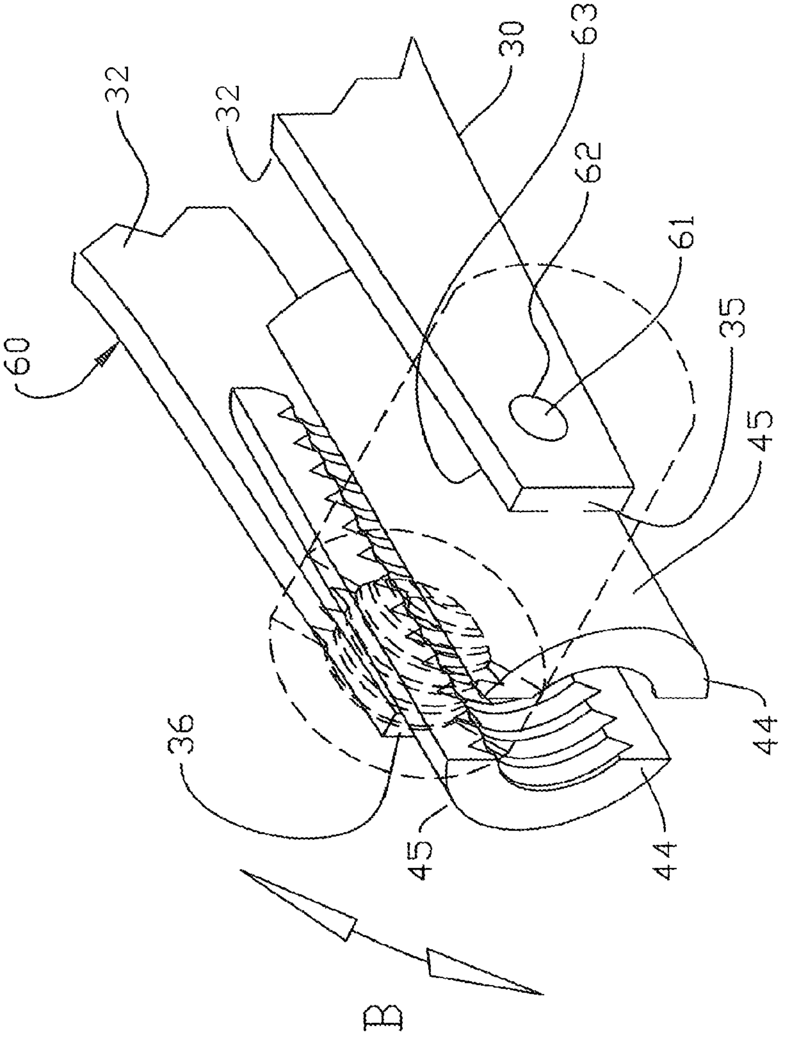
FIG. 4 is a fragmentary perspective view of an alternate embodiment of this invention.

In FIG. 4 is seen an alternate embodiment of this invention, generally designated by the reference character 60. In common with the previously described embodiment designated 20, the immediate embodiment 60 shares body 30 and a plurality of jaws 44. However, embodiment 60 includes pin 61 pivotally being carried in opening 62 in body 30 and enjoining into jaw 44. Although not shown herein, it will be understood by those skilled in the art that jaw 44 incorporates opening 63 used for affixing pin 61 into jaw 44, and preferably being retained with welding, adhesives, or other suitable mechanical method. Aforementioned method allows jaws 44 to rotate between a first position, wherein jaws 44 are substantially parallel with the arms of the "U-shaped" body 30 and a second position shown in phantom, where the jaws 44 are rotated to an offset position, as indicated by directional arrow B.

Figure 5:
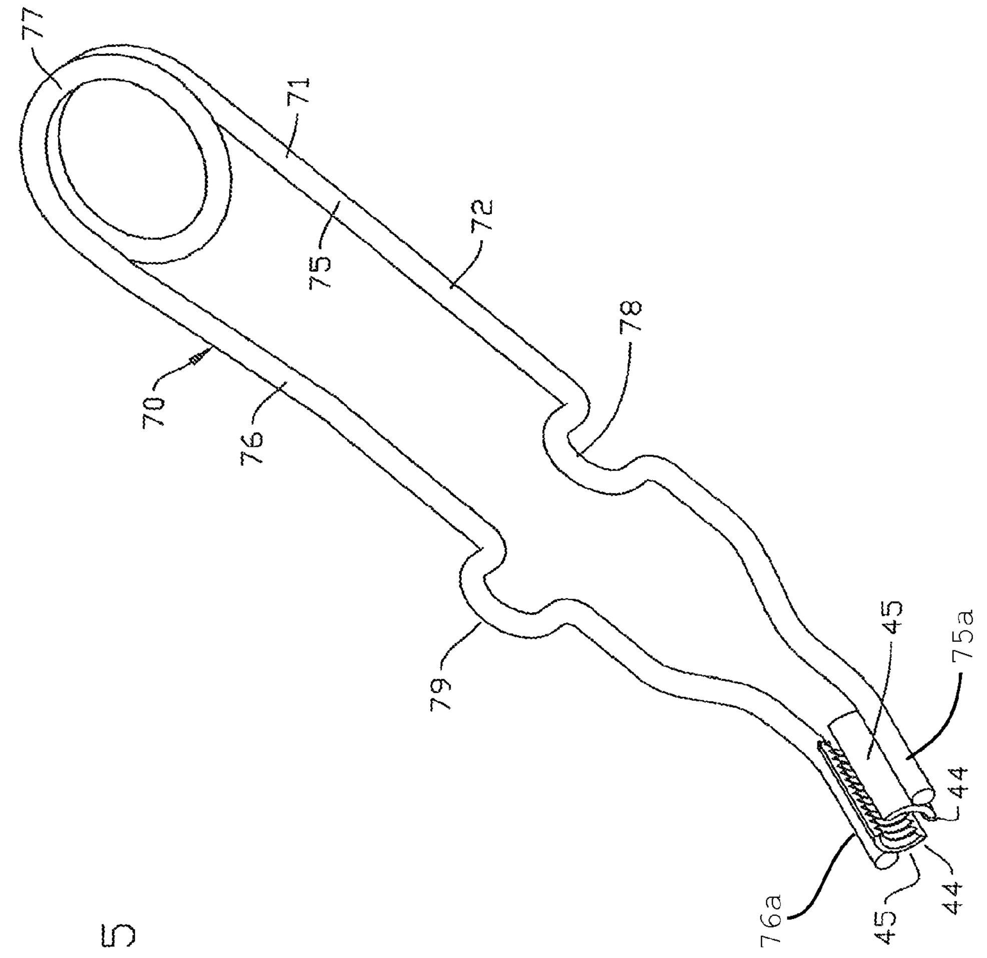
FIG. 5 is a perspective view of another alternate embodiment of this invention.

Turning now to FIG. 5, another alternate embodiment of the present invention is seen, generally designated by the reference character 70. In common with the previously described embodiment designated 20, the immediate embodiment 60 shares a plurality of jaws 44 having outer surface 45. The immediate embodiment 70 includes body 71 having outer surface 72 comprising a one piece unit having two coextensive arms 75 and 76 integrally joined together at one of their ends by a resilient connection 77 which preferably takes the form of a double loop formed in an intermediate part of the holder. Arm 75 has an upturned inverted U-shaped member 78, and arm 76 has an upturned inverted U-shaped member 79. Surface 45 of jaws 44 are affixed to outer surface 72 of body 71 proximate ends 75*a* and 76*a* and preferably retained using welding, adhesive, or forming methods.

Figure 6:
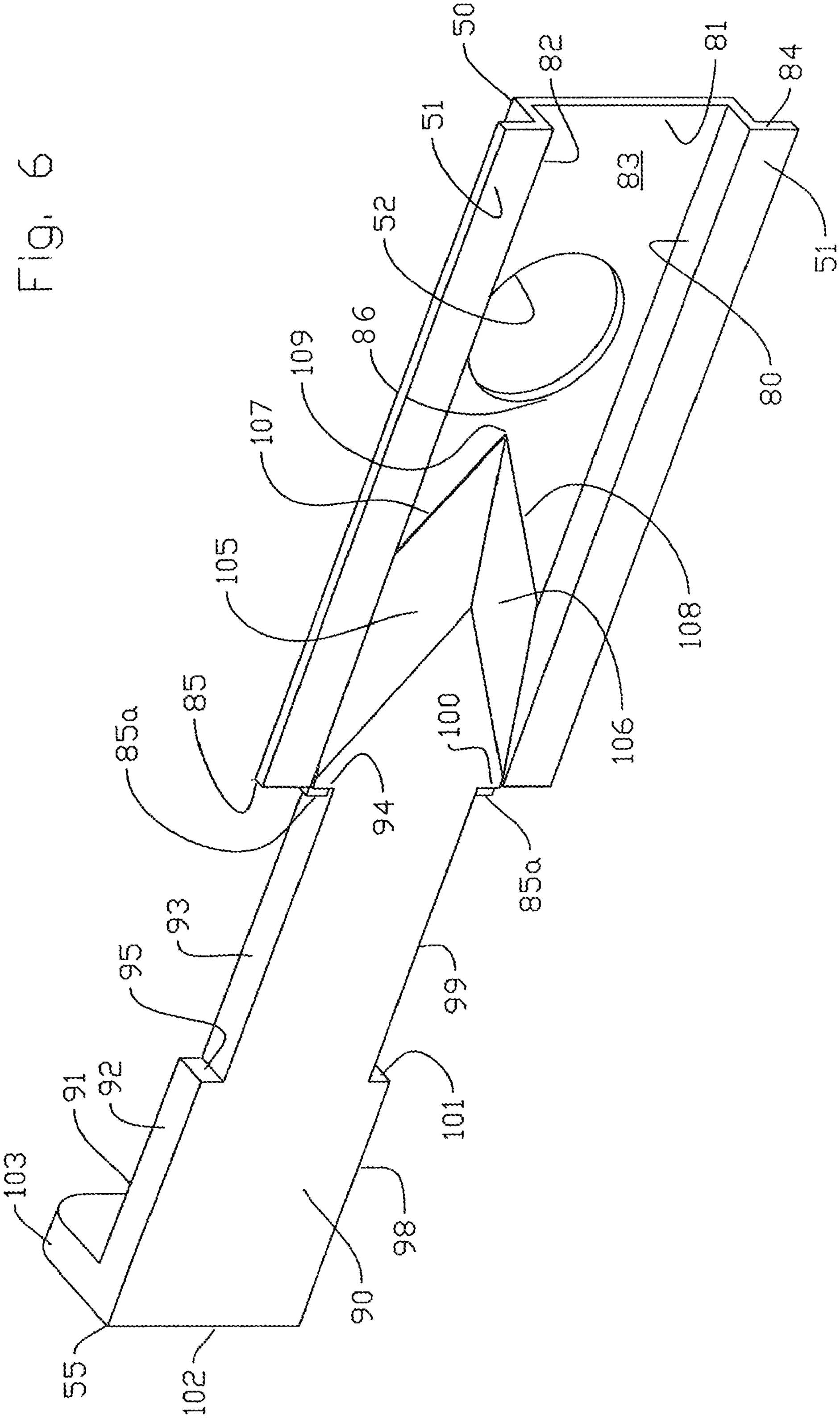
FIG. 6 is a fragmentary perspective view of components of this invention taken along line 2-2 of FIG. 2.

In FIG. 6 is seen clamp 50 having coplanar surface 51 with angularly disposed surface 80, lateral surface 81 with angularly disposed surface 82 terminating at surface 51, which cooperates to form recess 83, end 84 end 85 having angularly disposed members 85*a*. Also included in clamp 50 is opening 52 terminating at surface 81 cooperating to form edge 86. Also seen is cutter 55 having frontward surface 90, rearward surface 91, upper edge 92 having downwardly displaced portion 93 terminating with angularly displaced edge 94 and angularly displaced edge 95, lower edge 98 having upwardly displaced portion 99 terminating with angularly displaced edge 100 and angularly displaced edge 101, end 102 having angularly disposed member 103. Cutter 55 also has facet 105, which is angularly displaced from surface 90, and edge 92 and which terminates and converges with facet 106, which is angularly displaced from surface 90 and edge 98. It will be understood by those skilled in the art that the convergence of facet 105 and facet 106 cooperate to form sharp edge 107, sharp edge 108, and point 109.

In use, and as shown in FIG. 1 of this invention, tool device 20 may be used to clamp and grasp tubing 10 so as to generally assist with assembly of tube 10 onto fitting 11. Also, tubing 10 such as commercially available rubber or plastic irrigation tubing may be inserted appositionally into openings 37 and 52 shown in FIG. 2, and cutter movement as indicated by directional arrow C in FIG. 2, will preferably result in cutting tubing 10 therein.

The embodiments and methods of using the invention described herein are exemplary and numerous modifications, variations and rearrangements can be readily envisioned to achieve substantially equivalent results, all of which are intended to be embraced within the spirit and scope of the invention.

What is claimed is:

1. An irrigation fitting tool apparatus comprising:

a) at least one tool body forming at least one radius resiliently and integrally securing together a first coextensive member and a second coextensive member;
b) at least one first through bore opening through said first coextensive member;
c) at least one first tool jaw located toward a distal end of said first coextensive member;
d) at least one second tool jaw located toward a distal end of said second coextensive member;
e) a cutter located on said first coextensive member, wherein said cutter is substantially parallel to said first coextensive member;
f) at least one clamp;
g) a cutter body; and
h) at least one second through bore, wherein said cutter can be manually guided within said at least one clamp in response to moving said cutter body parallel to and past said at least one first through bore opening through said first coextensive member, to cut irrigation tubing held in said at least one first through bore opening through said first coextensive member and said at least one second through bore opening through said second coextensive member.

2. An irrigation fitting tool apparatus comprising:

a) at least one tool body forming at least one radius resiliently and integrally securing together a first coextensive member and a second coextensive member;
b) at least one first through bore opening through said first coextensive member;
c) at least one first tool jaw located toward a distal end of said first coextensive member;
d) at least one second tool jaw located toward a distal end of said second coextensive member;
e) a cutter located on said first coextensive member, wherein said cutter is substantially parallel to said first coextensive member;
f) a cutter body comprising first and second ends;
g) a facet forming at least one sharp point at the first end of said cutter body; and h) at least one angularly disposed member at the second end of said cutter body, wherein said at least one angularly disposed member is substantially perpendicular to remainder of said cutter body.

3. An irrigation fitting tool apparatus comprising:

a) at least one tool body forming at least one radius resiliently and integrally securing together a first coextensive member and a second coextensive member;

b) at least one first through bore opening through said first coextensive member;

c) at least one first tool jaw located toward a distal end of said first coextensive member;

d) at least one second tool jaw located toward a distal end of said second coextensive member, wherein said first and second tool jaws comprise an non-smooth inner surface having a substantially semi-circular arcuate shape for gripping and securing at least one length of irrigation tubing;

e) a cutter located on said first coextensive member, wherein said cutter is substantially parallel to said first coextensive member; and f) at least one clamp acting as a guider and a securer to guide and secure said cutter substantially parallel to said first coextensive member.

4. The irrigation fitting tool apparatus of claim 3 wherein said first and second coextensive members are biased a predetermined distance apart from each other.

5. The irrigation fitting tool apparatus of claim 3 wherein said cutter is adapted to cut irrigation tubing.

6. The irrigation fitting tool apparatus of claim 3 wherein said cutter further comprises:

a) a cutter body comprising first and second ends;

b) a facet forming at least one sharp point at the first end of said cutter body; and c) at least one angularly disposed member at the second end of said cutter body, wherein said at least one angularly disposed member is substantially perpendicular to remainder of said cutter body.

7. The irrigation fitting tool apparatus of claim 3 further comprising at least one clamp, a cutter body, and at least one second through bore, wherein said cutter can be manually guided within said at least one clamp in response to moving said cutter body parallel to and past said at least one first through bore opening through said first coextensive member, to cut irrigation tubing held in said at least one first through bore opening through said first coextensive member and said at least one second through bore opening through said second coextensive member.

* * * * *